Jan. 14, 1941.  W. V. FALCON  2,228,302
INTERNAL COMBUSTION ENGINE
Filed July 26, 1937   2 Sheets-Sheet 1
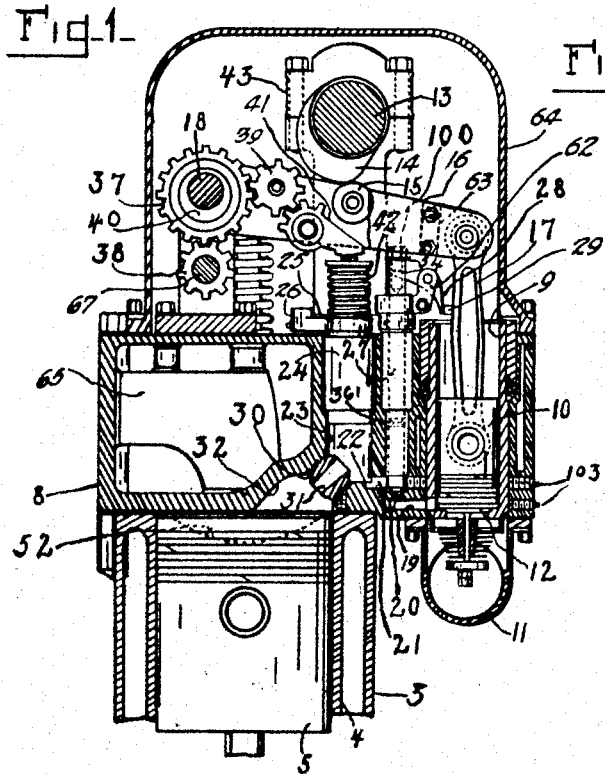
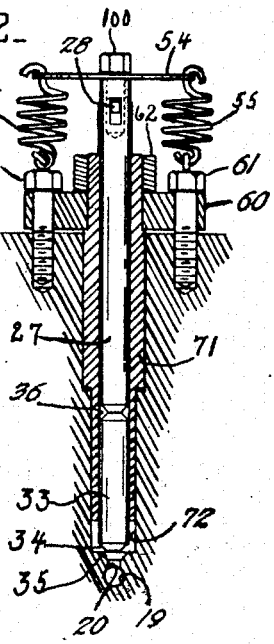
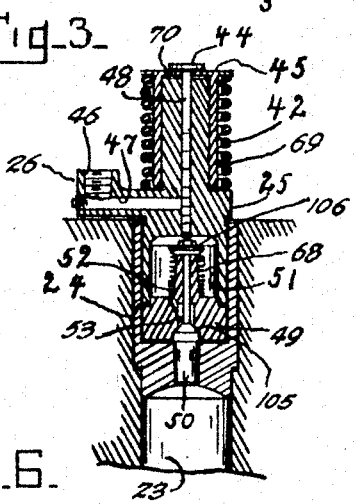
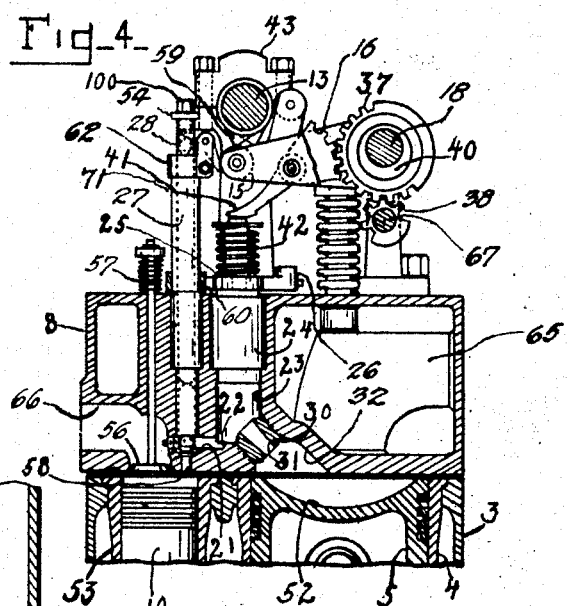
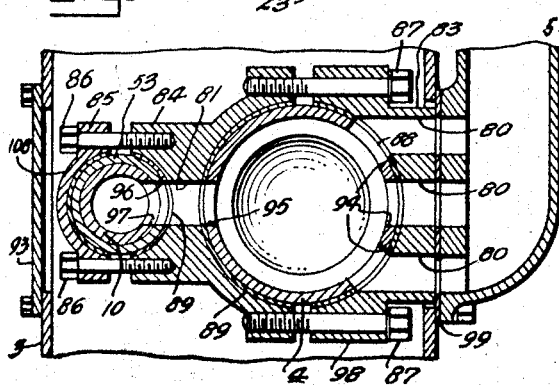
INVENTOR.
William V. Falcon Jan. 14, 1941.  W. V. FALCON  2,228,302
INTERNAL COMBUSTION ENGINE
Filed July 26, 1937  2 Sheets-Sheet 2
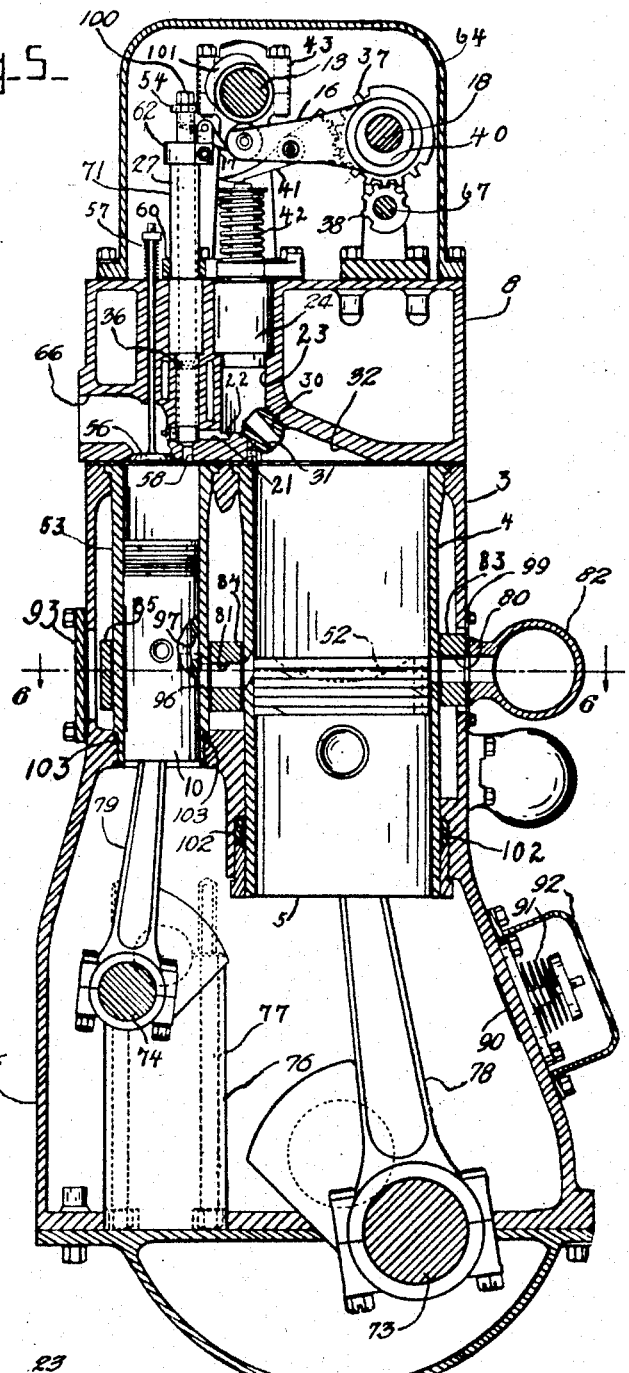
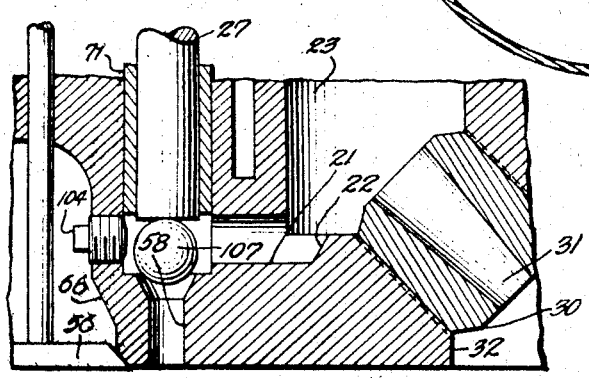
INVENTOR.
William V. Falcon Patented Jan. 14, 1941

2,228,302

UNITED STATES PATENT OFFICE 2,228,302

INTERNAL COMBUSTION ENGINE

William V. Falcon, Medford, Mass.

Application July 26, 1937, Serial No. 155,769

4 Claims. (Cl. 123—33)

My invention relates to improvements in internal combustion engines of the compression-ignition type and particularly to the parts which perform the working cycle of the engine, these being a pre-combustion chamber, an air compressor, the cylinder, piston, combustion space, and valve controlled communicating passages; and the objects of my invention are: first, to provide means in the construction, combination and arrangements of parts of the improved compression-ignition engine whereby fuels of low grade oils may be successfully burned on the constant-volume cycle of operation, to obtain greater engine speeds and efficiency of operation; second, to provide means in this class engine to lower the compression ratio in the working cylinder far beyond that heretofore employed; third, to provide means to thoroughly scavenge the consumed gases from the pre-combustion chamber, which is most important to obtain maximum efficiency in this class engine; fourth, to provide means to use air injection in a modified form and solid injection in combination with a pre-combustion chamber; fifth, to provide means to start injection of the fuel shortly after the intake valve has been closed, thereby providing a longer time in which the fuel may be injected, may gasify and mix with the air before combustion is initiated; sixth, to provide means to inject the fuel in a pre-combustion chamber in an atomized condition, retaining same in the pre-combustion chamber until a pre-determined time before ignition starts, at which time the said fuel charge is blown into the combustion space of the working cylinder by a blast of air highly compressed in a small cylinder; seventh, to provide means to compress a small quantity of air in a small cylinder at a pressure not less than twice the maximum compression pressure of the engine; eighth, to provide valve controlled means to control the time of ignition by controlling the time said compressed air is to be admitted into the pre-combustion chamber; ninth, to provide means in a low compression engine to rapidly raise the heat of compression far beyond the kindling temperature of the fuel by introducing a highly heated quantity of compressed air into the cylinder of the engine at a time just before the top center of the piston on the compression stroke; tenth, to provide means for the necessary turbulence of the fuel and air charge for a quick and complete burning of the fuel charge at constant-volume; eleventh, to provide means to control the amount of fuel to be injected into the pre-combustion chamber of the engine according to the speed and power output.

Other objects will appear hereinafter.

The invention consists in the combination and arrangement of parts hereinafter described and claimed.

The invention will be best understood by a reference to the accompanying drawings which form a part of this specification, and in which:

Fig. 1 is a vertical transverse sectional view of the upper portion of an engine embodying the invention taken through number one cylinder.

Fig. 2 is an enlarged side vertical view of valve 34 and the valve stem guide 71, showing the method employed to keep it in place by the use of the bolts 61—61, and also the springs 55—55 which hold the valve in a closed position.

Fig. 3 is an enlarged front sectional view of the fuel spray nozzle 24 and the fuel plunger pump 25, which are assembled into one unit.

Fig. 4 is another vertical transverse sectional view of the upper portion of an engine embodying the invention in a modified form taken through number one cylinder.

Fig. 5 is another vertical transverse sectional view of an engine of the two-cycle type taken through number one cylinder, showing the novel port scavenger action.

Fig. 6 is a figure taken on line 6—6 of Fig. 5.

Fig. 7 is an enlarged fragmentary portion of the cylinder head 8, illustrating the drilled passages 21 and 58 as shown in Figs. 4 and 5, and also a modified form of check valve 107.

As shown in the drawings the engine is illustrated as comprising a cylinder block 3, a cylinder 4, a concave piston 5 in said cylinder, and a cylinder head 8. The concave crown 52 of piston 5, together with a recess 32 in the said cylinder head, composes the combustion space of the engine. A camshaft 13, mounted on the cylinder head in any suitable bearing 43 in Figs. 1 and 4, rotates at one-half crankshaft speed, the engine being of the four-cycle type; in Fig. 5 the camshaft rotates at crankshaft speed, the engine being of the two-cycle type. A shaft 18 is also mounted in the cylinder head 8, the eccentrics 40 are machined too and are parts of it, and the arms 16, which are in two pieces, are fulcrum on the eccentrics 40 and extend partly across the top of the cylinder head 8. One side of said arms 16 is shown cut away in Figs. 1 and 4 to expose the gears 38—37, an arm 41, the roller 15 together with the upper end of the connecting rod 17, which are all assembled between said arms 16, the arms 16 being held at a set distance apart and together by the spaces 63. Just below the shaft 18 and in line with it is mounted a shaft 67 to which is attached a gear 38 to mesh with the gear 37. The fuel plunger pump 25 (see Fig. 3) and the fuel spray nozzle 24 are assembled together and form one unit and are positioned in a vertical opening in the cylinder head 8 extending about midway down, the lower portion of said opening forming the pre-combustion chamber 23, and said fuel pump, which is assembled above the spray nozzle, extending above the cylinder head 8 and being operated by the arms 16 through the medium of arm 41. In the lower end of the pre-combustion chamber is inserted a member 30 in which there is a tapering opening 31 in open communication with the combustion space of the engine, and across from said insert 30 a drilled passage 21 enters the pre-combustion chamber in such a manner as to form the deflector 22, said passage 21 communicating with the working end of cylinder 9 through the drilled passages 20 and 19 (see Fig. 1) and in Figs. 4 and 5 the said drilled passage 21 communicates with the cylinder 53 through the drilled passage 58.

In a vertical opening adjacent to the pre-combustion chamber, the fuel nozzle, and fuel pump, is positioned a one way valve 34, as shown in Fig. 2, a modified form of said valve being 107 in Fig. 7. The valve stems 27 and 33 as shown in Fig. 2 are fitted in a valve stem guide 71 which extends upward above the cylinder head 8, and thereto suitable means are assembled to open said valve 34, which means are a bell crank 28 and a boss 29. The said boss which is attached to the connecting rod 17 will strike the bell crank 28 as it moves downward and open the said valve 34 at the proper time. The valve 34 is held in a closed position by the springs 55—55, said valve 34 being made up of two valve stems 33 and 27. The lower portion 33 is lapped to fit a little more freely in the guide 71, and the two ends are so shaped as to form a space 36, and, due to the loose fit of section 33, the maximum pressures in the pre-combustion chamber will blow by and be maintained in the space 36. When the upper stem is moved upward at that time the maximum pressures in the drilled passages 19 and 20 will be sufficient to move the lower part 33 and allow the compressed air in the working end of the cylinder 9 to blow into the pre-combustion chamber through the drilled passage 21.

In the modified form of check valve shown in Fig. 7 the valve stem 27 is in one piece. A ball is positioned at the upper end of the passage 58 and below the flat lower end of plunger 27, which is lifted up in the manner above mentioned. When the stem 27 moves upward the pressure in passage 58 is greater than that in the drilled passage 21. Obviously the ball will move up and allow the compressed air in the working end of the cylinder 53 to pass into the pre-combustion chamber 23.

A cylinder 9 is assembled in an opening adjacent to the valve 34 and a piston 10 is mounted in said cylinder 9 and is attached to the arms 16 by means of the connecting rod 17. In the lower end of said cylinder 9 is mounted a one way spring-loaded intake valve 12 to admit air into the lower or working end of said cylinder when the piston 10 is brought upward by the arms 16. The arms 16 are moved downward by the action of the cam 14 on the roller 15 and returned upward by a spring 42 which also carries upward the plunger 48 of the fuel pump (see Fig. 3).

In Figs. 4 and 5 are found the following modifications: The cylinder 53 which corresponds to the cylinder 9 of Fig. 1 is positioned in the cylinder block 3 adjacent to the working cylinder 4, and the piston 10 is operated by a lay crankshaft 74 through the connection rod 79 as shown in Fig. 5. The camshaft 13 may be made a little lighter in view of the fact that the strain of operating piston 10 is herein removed. Changes are also made in the cams 59, Fig. 4, and 101 of Fig. 5; the engine is of the reversible two-cycle type. The camshaft 13 rotates at crankshaft speed; the lag crankshaft 74 also rotates at said speed.

A further novel feature is found in the castings 83, 84, and 108. Said castings are fitted to the outer circumference of the working cylinder 4 and the cylinder 53. They are held in place by the bolts 86—86 and 87—87 and are positioned so that the openings 80 and 81 will correspond to the openings 94 and 95 of the working cylinder 4; the opening 81 also corresponds to the opening 96 of the cylinder 53. On the same side the piston 10 has an opening 97 which will control communication between the crank case and the working cylinder through the openings 96 and 81. The exhaust manifold is attached to the casting 83 and the cylinder block 3.

Referring to Fig. 3, the fuel enters the fuel pump under low pressure through any suitable connection mounted in the threaded opening 46 in the boss 26 and through the drilled passage 47 into the pump barrel of the plunger 48. When the plunger 48 moves up by the force of the spring 42 a partial vacuum is created in space 51 until the end of drilled passage 47 is uncovered. Said partial vacuum in space 51 assisted by a low pressure in passage 47 will quickly fill the displacement effected by the upward movement of the plunger 48. When the said plunger is forced down by the arm 41, the fuel flows back into the passage 47 until the end of the plunger 48 covers the end of said passage 47. The trapped fuel in the pump barrel will be forced under moderate pressure through a suitable number of drilled passages 52 into an annular space 53 just above the valve 105 which is a part of plunger 50; plunger 50 is reduced in size at the valve seat 105 and it continues upward as a valve stem. At its upper end a valve spring retainer 106 is attached to it so as to provide an adjustment, whereby the aperture of the valve 105 may be adjusted to a very small fraction of an inch. The valve spring 68 will keep the said valve 105 in a closed position when the fuel pressure drops in the space 51. When the plunger 48 forces the fuel in the space 51, under sufficient pressure, the valve 105 is forced open and the fuel will flow past the valve seat and around the plunger 50 into the pre-combustion chamber in a finely divided condition.

The control of the engine is accomplished by controlling the operation of the fuel pump and the valve 34. The fuel pump is of the constant stroke type and the plane of plunger motion must be changed to vary the quantity of fuel to be injected; and that is accomplished by means of gears. As the arms 16 move up and down, the arm 41, which is mounted to them, will also move up and down, but the plane of said up and down movement must be changed and that is done by rotating the gears 38, 37, and 39 a little (see Fig. 1). When the shaft 67 is rotated to the right or left, through the said gears, the arm 41 will change the stroke of the plunger 48, for the plunger follows the arm 41. The plunger positioned in Fig. 3 will inject its maximum amount of fuel. When moving in this plane the lower end of the plunger at its upper position will be about even with the upper side of the passage 47 to allow the pump barrel to fill with fuel.

By rotating shaft 18 the eccentrics 40 are also rotated. The arms 16, which are fulcrum on eccentrics 40, will move with them. This will change the position of the roller 15 relative to its center position to the camshaft 13. By rotating eccentrics 40 to the right of their present center position, the arms 16 will be moved to the left and the cam 14 will be caused to strike the roller 15 earlier; by rotating the said eccentrics 40 in a left hand direction, the above action will be reversed. In this manner the time relation of the arms 16 will be changed relative to that of the working piston travel. By changing the time, the boss 29 on the connecting rod 17 strikes the bell crank 28 and likewise opens the valve 34 early or late, regulating the time said compressed and highly heated air may flow into the combustion space of the engine. In this manner the ignition time is regulated to the speed of the engine.

Referring to Fig. 1 with the parts positioned as shown and described, the operation of the engine is as follows: The working piston 5 is near the top center on the fourth or compression stroke and the cam 14 on camshaft 13 has caused the arms 16 to move downward near its lowest position, bringing down with it the piston 10 which is connected to it by means of the connecting rod 17. The fuel pump is also near completion of its operation, being forced down by the arm 41. A boss 29 attached to the connecting rod 17 has come in contact with a bell crank 28 which has opened the check valve 34, allowing the highly compressed air, which has been heated by the work done to it during compression in the working end of cylinder 9 and the passages 19 and 20, to flow into the passage 21 and into the pre-combustion chamber 23. This transfer of said air is accomplished in a small fraction of a second; therefore the air travel is at high velocity, and, when it strikes the deflector 22 as it is about to enter the pre-combustion chamber, will swirl upward into the pre-combustion chamber, raising the pressure therein and causing a reverse action in the flow of air from the cylinder into the pre-combustion chamber through the passage 31 of the insert 30, and the greater part of admixture of fuel and air in the pre-combustion chamber will be blown into the combustion space with such force that it will penetrate the entire amount of air contained in it, causing the necessary turbulent action to thoroughly mix the fuel and air in preparation for a quick and complete burning when said admixture is followed by an extremely hot flame caused by an explosion in the pre-combustion chamber. Combustion is first initiated in the pre-combustion chamber by the said heated air of cylinder 9 and, naturally, nearly the full charge of fuel being present in the combustion space when combustion takes place, the entire charge will burn substantially at constant-volume, impelling the piston on its working stroke, thus completing the cycle of operation. While there are slight modifications in Figs. 4 and 5, the same description will apply.

While I have illustrated and described the present form of my invention, I do not wish to limit myself to the precise details of structure shown, but desire to avail myself of such variations and modifications as come within the scope of the appended claims.

What I claim is:

1. In an internal combustion engine having a chamber, the combination of a plunger-type fuel injector for said chamber; a plunger-type air pump; a normally closed valve for providing communication between said chamber and the discharge side of said pump; an engine-driven cam; a single movable member actuated by said cam for reciprocating said pump plunger; means actuated by said reciprocating pump plunger for opening said valve; and an element adjustably carried by said member for reciprocating said injector plunger through a variable stroke for the injection into said chamber of fuel of variable quantities.

2. In an internal combustion engine having a chamber, the combination of a plunger-type fuel injector for said chamber; a plunger-type air pump; a normally closed valve for providing communication between said chamber and the discharge side of said pump; an engine-driven cam; a single pivoted member actuated by said cam for reciprocating said pump plunger; means actuated by said reciprocating pump plunger for opening said valve; an element pivotally carried by said member and adapted to reciprocate said injector plunger; an angularly adjustable shaft spaced from said member; and a gear connection between said shaft and element and including a gear rotatable coaxially of the pivot of said member, the fuel quantity of the injections being varied on adjustment of said shaft.

3. In an internal combustion engine having a chamber, the combination of a plunger-type fuel injector for said chamber; a plunger-type air pump discharging into said chamber; an engine-driven cam; an angularly adjustable eccentric; a single member journalled on said eccentric and actuated by said cam for reciprocating said pump plunger; an element pivotally carried by said member and adapted to reciprocate said injector plunger; an angularly adjustable shaft spaced from said member; and a gear connection between said shaft and element and including a gear rotatable on said eccentric, the fuel quantity of the injections being varied on adjustment of said shaft and the operation of said pump and injector being advanced or retarded in the engine operation on adjusting said eccentric.

4. In an internal combustion engine having a chamber, the combination of a plunger-type fuel injector for said chamber; a plunger-type air pump; a normally closed valve for providing communication between said chamber and the discharge side of said pump; an engine-driven cam; an angularly adjustable eccentric; a single member journalled on said eccentric and actuated by said cam for reciprocating said pump plunger; means actuated by said reciprocating pump plunger for opening said valve; an element pivotally carried by said member and adapted to reciprocate said injector plunger; an angularly adjustable shaft spaced from said member; and a gear connection between said shaft and element and including a gear rotatable on said eccentric, the fuel quantity of the injections being varied on adjustment of said shaft and the operation of said pump and injector as well as the opening of said valve being advanced or retarded in the engine operation on adjusting said eccentric.

WILLIAM V. FALCON.